United States Patent [19]

Waite

[11] 4,044,951
[45] Aug. 30, 1977

[54] SPRAY TUBING WITHIN A ROTATING DRUM SUPPORTED INDEPENDENTLY OF THE DRUM

[75] Inventor: John J. Waite, Chateauguay, Canada

[73] Assignee: Allis-Chalmers Corporation, Milwaukee, Wis.

[21] Appl. No.: 614,521

[22] Filed: Sept. 18, 1975

Related U.S. Application Data

[62] Division of Ser. No. 523,526, Nov. 13, 1974, Pat. No. 3,933,313.

[51] Int. Cl.² .................... F16L 3/00; F26B 11/04
[52] U.S. Cl. .......................................... 239/1; 34/138; 134/153; 134/172; 239/273; 239/602; 248/1; 266/173; 285/114; 432/85

[58] Field of Search ............... 239/1, 273, 602, 569, 239/589; 432/85, 103, 116; 266/173; 134/152, 153, 167 R, 168 R, 172; 248/49, 58, 1; 34/138; 118/19, 24, 303; 302/64; 138/103, 106; 285/61, 114

[56] References Cited

U.S. PATENT DOCUMENTS

| 2,543,776 | 3/1951 | Greisen | 34/138 |
| 2,884,203 | 4/1959 | Broughton | 239/569 X |
| 2,908,295 | 10/1959 | Beazley | 285/114 |
| 3,222,092 | 12/1965 | Olson | 285/114 |
| 3,676,074 | 7/1972 | Shibayama et al. | 34/138 X |

Primary Examiner—Evon C. Blunk
Assistant Examiner—Andres Kashnikow
Attorney, Agent, or Firm—Robert C. Jones

[57] ABSTRACT

A detachable mounting and support arrangement for the stationary spray tube which extends through a rotary drum. A tension cable extends through the spray tube and is anchored exteriorly of the drum and spray tube at each end of the drum.

2 Claims, 2 Drawing Figures

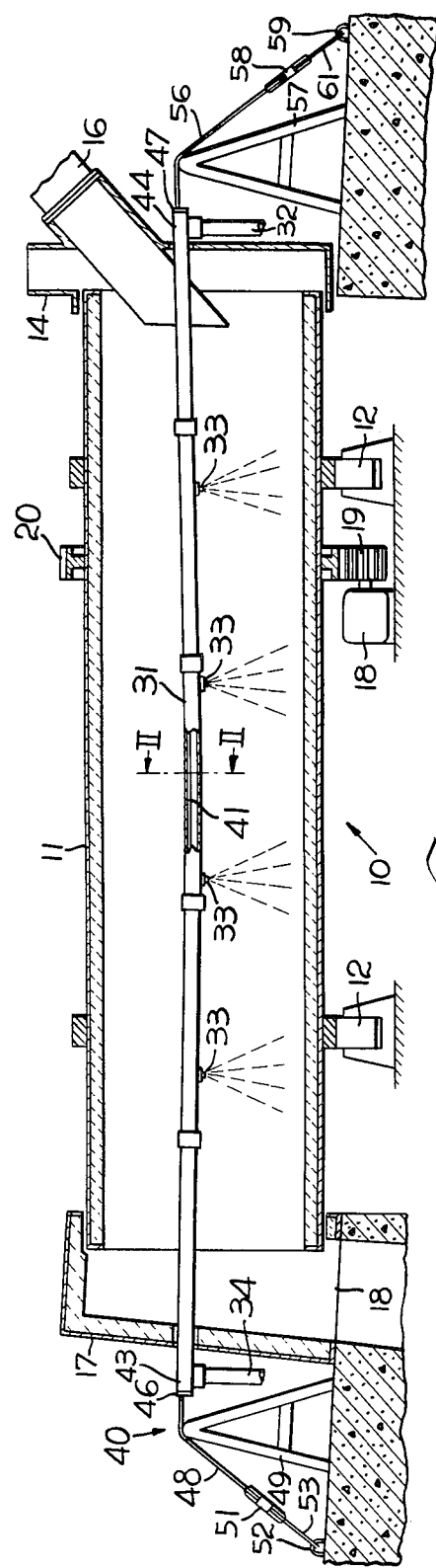
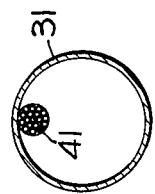
Fig. 1
Fig. 2

SPRAY TUBING WITHIN A ROTATING DRUM SUPPORTED INDEPENDENTLY OF THE DRUM

This is a division of application Ser. No. 523,526 filed Nov. 13, 1974, now U.S. Pat. No. 3,933,313.

BACKGROUND OF THE INVENTION

This invention relates generally to rotary drums or coolers, and in particular to the spray tubing therein which conveys cooling water to the interior of the rotating drum. In the prior art, spray tubes are known but these tubes have been supported so as to rotate with the drum. In extremely long coolers or drums, 100 feet or more, the weight of the tube makes it mechanically impossible to support the tube in a rotary cooler. This is particularly true when, in addition to the length of the cooler, temperatures of the product within the cooler are initially at 2500° F. Thus, the combination of the factors of length, weight and temperature combine to defeat the usual supporting arrangement for cooling tubes. Known arrangements for supporting spray tubes, such as rotating spider supports with central water cooled and lubricated bearings, present problems that affect product flow through the cooler, contamination of the product as it moves through the cooler and access for servicing. The steel frame or truss support is entirely too large and is also sensitive to the extremely high temperature of the material within the cooler and would require its own cooling system.

These known supporting arrangements offer no suggestions to solving the particular problem, and it is to solving this problem that the invention is directed and a solution provided.

SUMMARY OF THE PRESENT INVENTION

According to a preferred embodiment of the present invention, a rotary cooler having a long cylindrical shell mounted to rotate about its central axis is provided. Extending longitudinally through the cylindrical cooler shell is a spray pipe or tube which is supported independently of the cylindrical shell. A cable extends through the spray pipe or tube and is anchored at each end beyond the ends of the cylindrical cooler shell. The cable is under tension and supports the spray pipe in substantial parallelism with the axis of the cylindrical cooler shell. Thus, the cable supports the weight of the spray pipe and the cooling fluid flowing through the pipe without interfering with the normal operation of the rotary cooler.

DESCRIPTION OF THE DRAWINGS

FIG. 1 is a side elevation partly in section of a rotary cooler incorporating the present invention; and, FIG. 2 is a view taken along the line II—II in FIG. 1.

DESCRIPTION OF THE PREFERRED EMBODIMENT

According to the preferred embodiment of the present invention, a rotary cooler 10 comprising a cylindrical shell is mounted on rollers 12 for rotation of the cylindrical shell about its own axis. The shell 11 has a material inlet end provided with a feed hood 14 having a supply chute 16 projecting therethrough and into the rotatable cylindrical shell 11. The cooler 10, at its opposite end, is provided with a material outlet including a discharge hood 17 having a material outlet 18 for cooled material and the fluid coolant. Power for rotating the cylindrical cooler shell 11 is obtained from a motor 18, the drive shaft of which is provided with a gear 19 adapted to mesh with a bull gear 20 affixed to the shell 11.

The cooler shell 11 receives a spray pipe 31 which extends through the entire length of the cooler shell 11 and outwardly beyond the inlet and outlet hoods 14 and 17. The spray pipe 31 can be assembled in convenient lengths and jointed to facilitate the insertion of the spray pipe into the shell 11. The assembled spray pipe 31 extends outwardly of the feed hood 14 and the discharge hood 17. At the feed end of the cooler, the spray pipe 31 is provided with a fluid inlet pipe 32 which provides a sufficient volume of fluid to the spray pipe 31 to maintain the desired discharge pressure through the plurality of spray nozzles 33, only four being depicted. The volume of fluid provided to the spray pipe 31 is also sufficient to maintain the pipe 31 in substantially full capacity at all times. At the discharge end of the cooler 11, the spray pipe 31 is provided with an outlet 34.

To provide the extremely long spray pipe 31 within the cooler 10 and not encumber the cylindrical shell 11 with interfering structure, a novel support arrangement has been provided. To this end, a cable suspension means 40 is provided. As shown in simplified format, a stranded cable 41 is inserted through the spray pipe 31 and extends outward of both of the external ends 43 and 44 of the spray pipe 31. The external ends 43 and 44 of the spray pipe 31 through which the cable 31 extends are sealed by means of a stuffing box 46 and 47 or other suitable means, such as a seal incorporating a clamping device. In any event, the seals 46 and 47 effectively prevent fluid in the spray pipe 31 from leaking or escaping from the pipe. This arrangement maintains the desired pressure within the pipe so that the spray nozzles 33 cover their designated areas. The end 48 of the cable 31 is entrained over an upright support 49 and secured to one end of a tensioner 51. The opposite end of the tensioner 51 is secured to an anchor 52 by means of a relatively short length of cable 53. It will be appreciated that the tensioner 51 can be secured directly to the anchor 52. A similar arrangement is provided for the opposite end of the cable wherein the extending end 56 is entrained over a support 57 and secured to a tensioner 58. The opposite end of the tensioner 58 is secured to an anchor 59 by means of a relatively short strand of cable 61.

With the arrangement described, the spray piping or tubing 31 can be assembled in convenient lengths and jointed. The cable 41 and pipe 31 will assume a natural sag which will be stable and can be compensated for when positioning the nozzles 33. The cable 41 within the spray pipe 31 is immersed in the fluid coolant and is not subject to heat distress. With the arrangement, the cable 41 is also protected from erosion by steam or abrasives and can be further protected from water corrosion, if necessary, by a suitable coating.

From the foregoing description of the present invention, it has been shown how the objects of the preferred arrangement of the invention have been attained. However, modifications of the concept disclosed which may occur to those skilled in the art, now that the invention has been disclosed, are intended to be included within the scope of the invention.

The embodiments of the invention in which an exclusive property or privilege is claimed are defined as follows:

1. In a method of supporting an elongated spray pipe within the cylindrical shell of a rotating cooling device comprising;
   of providing the spray pipe with a support internally thereof and extending outwardly from each end of the spray pipe and the cylindrical shell;
   of anchoring both external ends of the support externally of the cylindrical shell; and,
   of applying a tensioning force to at least one external end of the support.

2. In a method of supporting a spray pipe within an elongated cylindrical shell of a rotating cooling device comprising;
   of providing the spray pipe with an internal support that extends outwardly of the spray pipe and externally of the cylindrical shell;
   of anchoring both ends of the support externally of the cylindrical shell;
   of supporting the spray pipe support at each end externally of the cylindrical shell in a plane which substantially connects with the axis about which the cylindrical shell rotates; and,
   of applying a tenson force to at least one end of the spray pipe support.

* * * * *